Oct. 24, 1961  J. DOLZA  3,005,920
COMMUTATOR FOR DYNAMO ELECTRIC MACHINES
AND MANUFACTURING METHOD
Filed June 17, 1959  2 Sheets—Sheet 1

United States Patent Office 3,005,920
Patented Oct. 24, 1961

3,005,920
COMMUTATOR FOR DYNAMO ELECTRIC MACHINES AND MANUFACTURING METHOD
John Dolza, Turin, Italy, assignor to
Fiat Societa per Azioni, Turin, Italy
Filed June 17, 1959, Ser. No. 821,044
Claims priority, application Italy Jan. 19, 1959
8 Claims. (Cl. 310—235)

This invention relates to commutators for dynamo-electric machines, in which a circumferential set of segments of copper or equivalent material are anchored to the periphery of a cylindrical body of insulating material, adapted to be keyed to the rotor shaft of the machine.

Methods known heretofore for manufacturing commutators necessitate a relatively elaborate equipment and imply a considerable consumption of work and valuable metal, such as copper. These drawbacks are chiefly due to the structure of the means for securing the segments to the insulating body. The broader object of this invention is therefore to provide an advantageous commutator structure which considerably facilitates manufacture.

A further object of this invention is to provide an advantageous method of manufacturing commutators for dynamo-electric machines.

Broadly the means for attaching the segments to the insulating body each comprises a metal plate having an intermediate section joined to its respective segment throughout the length of the latter, and two end sections bent to hook shape towards the axis of the body embedded in the insulating material of the body.

Further characteristic features of this invention will be understood from the appended description referring to the accompanying drawing given by way of example, wherein:

FIGURE 1 is a plan view of a flat bimetallic blank adapted to be converted to a cylindrical crown of segments;

FIGURE 2 is an end view of FIGURE 1;

FIGURE 3 is a view from below of FIGURE 1, after the blank has undergone a step of the method, FIGURE 4 is a part sectional view on line 4—4 of FIGURE 3;

FIGURE 5 is a view similar to FIGURE 1 after a further step of the process has been performed;

FIGURE 6 is a cross sectional view on line 6—6 of FIGURE 5;

FIGURE 7 is a section similar to FIGURE 6 after a further step of the process has been performed;

FIGURE 8 is a plan view, in which the blank shown in FIGURE 7 has been curved to a cylindrical shape preparatory to the step of moulding the insulating body;

FIGURE 9 is a part sectional side view-showing the commutator prior to the finishing step, and FIGURE 10 is a fragmentary sectional view on line 10—10 of FIGURE 9.

Figure 1:
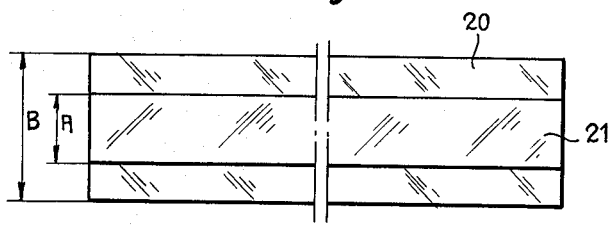
FIGURES 1 to 10 show the essential steps of the manufacturing method.
Figure 2:
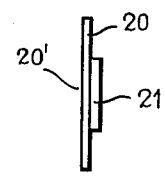

The blank shown in FIGURES 1 and 2 comprises a rectangular steel strip 20, on one face of which a copper plate 21 has been electrolytically deposited. The copper plate 21 coats a middle section of the strip 20 throughout the length of the latter and is of a width A ranging between ⅓ and ½ the width B of the strip 20.

Electrolytical deposition may be effected, for instance, while the marginal longitudinal sections of the strip 20 are protected by means of a suitable lacquer so the copper deposits on the longitudinal middle section. Alternatively, the blank can be cut to the desired size from a steel-copper rolled blank obtainable in sheet form by electrometallurgical works manufacturing electrolytic copper. In this case the strip 20 is initially copper-coated on one face through and an additional step is introduced consisting in removing copper from the longitudinal marginal regions of the strip to the desired width A. Removal of copper can be effected mechanically or, if desired, chemically.

As a further alternative the blanks 20, 21 can be obtained by plating by any known preferably continuous method, by which an endless steel strip of a width B is plated on one face by a copper band of a width A. It is essential for the copper band 21 to be thoroughly bonded to the strip 20 without any discontinuity as might subsequently lead to loosening of individual copper segments from their metal base.

Figure 3:
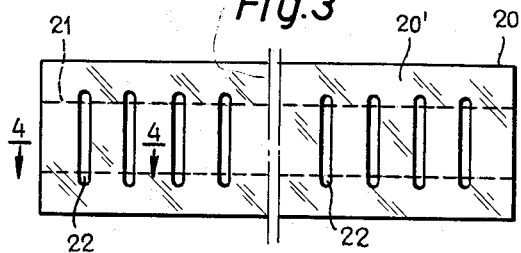
Figure 4:
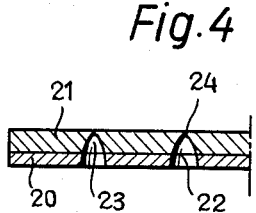

The blank 20, 21 is now machined on its bare face 20' to cut a plurality of parallel cross slots 22 in the strip 20, FIGURES 3 and 4, and a corresponding number of grooves 23 in the copper plate 21, the grooves and slots being in register with one another. The number of slots equals the desired number of commutator segments, their spacing substantially equalling the desired circumferential segment pitch. It will be seen from FIGURE 3 that the length of the slots 22 exceeds the width A of the copper band 21, so that the slots extend beyond the longitudinal edges of the latter.

The above described machining step is preferably carried out on a multiple milling cutter in order to simultaneously form all the slots 22 and grooves 23. However, other methods, such as coining can be employed. At any rate the grooves 23 should be of such depth as to leave on the groove bottom a metal thickness just sufficient to mechanically interconnect the copper segments into which the plate 21 has been subdivided by the grooves, such mechanical interconnection being essential to the subsequent steps of the process to be described hereafter.

Figure 5:
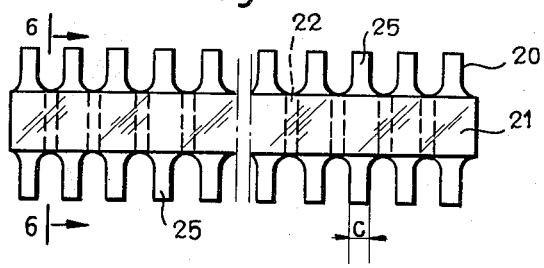
Figure 6:
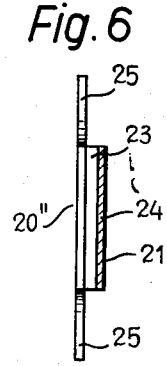
Figure 7:
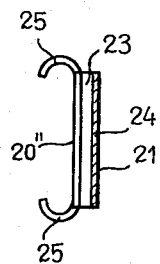
Figure 8:
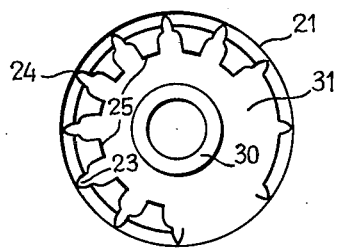

The next step consists in opening the ends of the slots 22 in order to subdivide the strip 20 into as many separate segments 20" (FIGURES 5 and 6) having opposite tongue-shaped ends 25 extending from an intermediate section thoroughly bonded to its respective segment formed in the copper band 21. This step is preferably carried out by shearing to remove metal from the strip 20 at the ends of each slot 22, care being taken that the width C of each tongue 25 is smaller than the spacing of two adjacent grooves or slots. The tongues 25 are now bent to hook-shape (FIGURE 7) to position them on the opposite side with respect to the copper plate 21, the copper-steel unit being curved to a cylindrical shape (FIGURE 8), in which the tongues 25 are positioned within the cylinder, the circumferential surface of which is confined by the copper plate 21. During the steps of the process shown in FIGURES 7 and 8 the unit 20", 21 is held together integrally merely through the thin metal webs 24 mentioned with reference to FIGURE 4 which affford continuity of the outer surface of the cylindrical unit shown in FIGURE 8. With this arrangement, moreover, the tongues 25 curved to hook-shape extend somewhat beyond the ends of the potential segments confined by the grooves 23. The resulting unit is now placed in a suitable mould, a metal sleeve 30 being arranged in the middle of the mould coaxially with the cylindrical unit. An annular clearance 31 is thereby left between the latter and sleeve 30, into which a thermosetting insulating material is injected, which completely fills the clearance and grooves 23 and wraps the tongues 25 more or less fully. The thermosetting material can be a phenol, urea or other resin, preferably admixed with a fibrous filler, such as glass, cotton or other fibers, which are electrically insulating.

Figure 9:
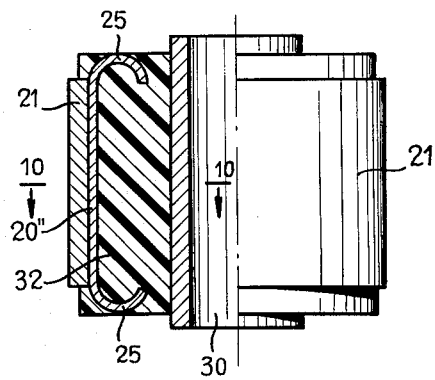
Figure 10:
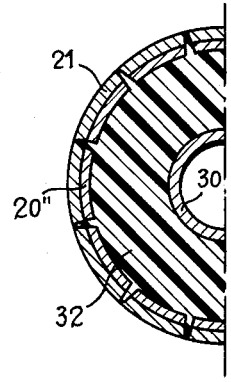

The resulting "raw" commutator is shown in FIGURES 9 and 10, in which 32 denotes the supporting cylindrical body manufactured by injection of thermosetting hardening material. FIGURE 9 further shows that the tongues 25 are hooked into the body material and embedded therein.

Figure 11:
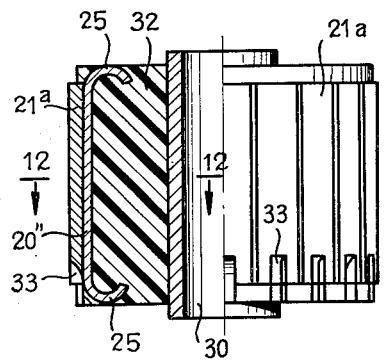
FIGURES 11 and 12 are a part sectional view and a cross sectional view, respectively, of the improved commutator. More particularly.
Figure 12:

The finishing step is now carried out, at which the raw commutator is placed on a lathe, to turn its outer surface and remove metal (copper) therefrom till the grooves 23 are exposed, thereby eliminating the thin metal webs 24 and conferring to the commutator a true circular cylindrical shape. The copper plate 21 is thereby subdivided into segments 21a (FIGURES 11 and 12) electrically separated from one another. The segments are each joined throughout their length to the intermediate section 20″ of their respective base segments the hook-shaped ends 25 of which act as effective fastening means to the supporting cylinder 32. The only thing to do now is to mill at one end of each segment 21a a notch 33 adapted to receive the ends of the armature winding leads of the dynamo-electric machine.

Though the invention has been described in detail with reference to an embodiment thereof, it should be understood that this does not imply a limitation, and a number of modifications can be made within the range of technical equivalents without departing from the scope of the appended claims, which should be construed in the light of the specification as broadly as admitted by the state of prior art.

What I claim is:

1. Commutator for dynamo-electric machines comprising a supporting cylindrical body of electrically insulating material, a circumferential set of segments of strips of electrical conducting material bonded to the center portion of a strip of strong reinforcing material, the end portion of the reinforcing material remaining bare, said segments attached to the periphery of the body, and said bare end portions of the strip of reinforcing material comprising fastening means for the segments, when bent to hook-shape toward the body axis and embedded in the insulating body material.

2. Method of manufacturing a commutator for dynamo-electric machines comprising the steps of providing on one face of a rectangular base strip, a lining plate of an electrical conducting material throughout the length of the latter, machining through the base strip to form a plurality of parallel cross slots by removing material from the base strip starting from its bare face and machining into the electrical conducting material thereby forming in the latter a plurality of parallel cross grooves registering with the slots, opening the ends of the slots by removing material from the marginal zones of the base strip which are free from the lining plate, thereby subdividing the base strip into a plurality of cross tongues each having an intermediate section bonded to the lining plate throughout the width of the latter, bending to hook-form the end sections of the tongues and cylindrically curving the base strip and lining plate, so that the portions bent to hook form are positioned within the cylinder, and the lining plate is on the outside of the cylinder, placing and supporting a metal sleeve axially in the cylinder, filling the inside of the cylinder between the bare strip and the sleeve with a thermosetting insulating material to embed therein the hook-shaped sections and the axial sleeve; and machining the cylindrical surface of the resulting unit on the lathe to remove electrical conducting material from the lining plate down to the grooves, thereby subdividing the lining plate into segments electrically separated from one another.

3. Commutator for dynamo-electric machines comprising a cylindrical supporting body of an electrically insulating thermosetting material, a circumferential set of copper segments attached to the periphery of the body, and attachment means for the segments, each comprising a tongue of ferrous material having an intermediate section joined to its respective segment throughout the length of the latter, and two end sections bent to hook-shape toward the body axis embedded in the material of the body.

4. Method as claimed in claim 2, in which the step of lining one face of a rectangular base strip with an electrical conducting material consists in electrically depositing a copper lining plate on a side base strip.

5. Method as claimed in claim 2, wherein the step of lining one face of a rectangular base strip by a plate consists in copper coating said strip throughout and removing the deposited copper from two marginal zones of the base strip.

6. Method as claimed in claim 2, wherein the slots in the base strip are cut over a length greater than the width of the lining plate so as to extend beyond the two longitudinal edges of the latter.

7. Method as claimed is claim 6, in which opening of the slot ends is performed by cutting a number of grooves in both marginal sections of the base strip.

8. Method as claimed in claim 2, in which the base strip is made of steel.

References Cited in the file of this patent

UNITED STATES PATENTS

| | | |
|---|---|---|
| 1,922,317 | Mudge | Aug. 15, 1933 |
| 2,207,594 | Loveland | July 9, 1940 |
| 2,400,590 | Meyerhoefer | May 21, 1946 |

FOREIGN PATENTS

| | | |
|---|---|---|
| 937,183 | Germany | Dec. 29, 1955 |